United States Patent [19]
Mo et al.

[11] Patent Number: 5,754,565
[45] Date of Patent: May 19, 1998

[54] RECONSTRUCTION OF SYNDROMES FOR BI-LEVEL ON-THE-FLY ERROR CORRECTION IN DISK DRIVE SYSTEMS

[75] Inventors: Shih Mo, Milpitas; Stanley M. Chang, Irvine, both of Calif.

[73] Assignee: Quantum Corporation, Milpitas, Calif.

[21] Appl. No.: 730,260

[22] Filed: Oct. 15, 1996

[51] Int. Cl.$^6$ .................................................. G11B 20/18
[52] U.S. Cl. ........................................ 371/40.14; 371/38.1
[58] Field of Search ............................. 371/40.14, 38.1

[56] References Cited

U.S. PATENT DOCUMENTS

| | | | |
|---|---|---|---|
| 4,782,490 | 11/1988 | Tenengolts | 371/40 |
| 4,916,702 | 4/1990 | Berlekamp | 371/39.1 |
| 5,280,488 | 1/1994 | Glover et al. | 371/37.1 |

Primary Examiner—Stephen M. Baker
Attorney, Agent, or Firm—Debra A. Chun

[57] ABSTRACT

A method and apparatus for reconstructing syndromes in a disk drive system. In the present invention, two levels of handling data errors are provided. The first attempt at correcting errors is performed by a dedicated error correction hardware. The error correction is based on a syndrome which was generated as a function of the data and ECC bits. An ECC code is selected such that the resulting syndromes produces a repeating, cyclical pattern. If the hardware correction circuit is unable to correct the error, the original syndrome value is reconstructed by processing the syndrome a number of times to where its current value in the next cycle corresponds to the original value in a previous cycle. This reconstructed syndrome is then used by the processor to handle the persisting error under firmware control.

18 Claims, 5 Drawing Sheets

RECONSTRUCTION OF SYNDROMES FOR BI-LEVEL ON-THE-FLY ERROR CORRECTION IN DISK DRIVE SYSTEMS

TECHNICAL FIELD

The present invention relates to the field of error correction in disk drive devices. More specifically, the present invention pertains to a method for reconstructing syndromes such that error correction can be performed on-the-fly, thereby eliminating the need for halting the disk drive, re-reading a bad sector, and re-calculating the syndrome.

BACKGROUND ART

Computer systems store data in a number of different storage systems.

One common computer system storage system is that of hard disk drives. In a hard disk drive, the bits (i.e., "1's" and "0's") of digital data are stored magnetically onto one or more storage disks. A transducer is positioned by an actuator assembly over a rotating disk. Often, the same transducer is used to write the data onto the rotating disk as well as read data that had been previously stored. However, errors may occasionally occur due to any number of reasons (e.g., a small portions of the disk media might become corrupted, electrical interference, etc.). Unless these errors are corrected, the data will become compromised. This may lead to serious consequences. For example, incorrect financial data can be disastrous. Furthermore, any errors in a computer program stored in a hard disk drive may cause the entire computer system to crash. It is virtually impossible to economically manufacture hard disk drives which are impervious to errors. Thus, there must be some mechanism for detecting and correcting any errors which might be encountered.

One way to correct for potential errors involves appending error correction code (ECC) bits at the end of each data segment. Before data is actually written to a disk, the disk drive calculates a unique ECC for each of the data segments. The data along with its unique set of ECC bits are written to the disk. Subsequently, when the data is later read back from the disk, the corresponding ECC bits are also read back. The disk drive checks the retrieved data against its corresponding ECC to determine whether there were any errors in the retrieved data. If there are no errors, the disk drive continues with its normal mode of operations. However, if an error is detected, the disk drive attempts to correct the error based on the ECC bits. One common approach for correcting errors involves the use of syndromes. Basically, a syndrome is derived from the ECC bits. If a syndrome is zero, this indicates that the data is correct or that no errors are detected. However, any non-zero syndrome indicates that there is an error.

Given a non-zero syndrome, there are many different ways in which the error may be fixed. One mechanism entails using dedicated, specially designed hardware circuitry which manipulates the syndrome to extract information as to which specific data bits are incorrect. Those bits are then fixed and the disk drive may then continue with its normal mode of operation. This type of error correction is so fast and efficient that it does not cause any noticeable interruption to the host. However, there are several disadvantages to implementing hardware error correction circuitry. First, the additional circuitry increases the overall cost of the disk drive. Even a slight incremental cost can be quite severe when magnified by the high quantities of disk drives being manufactured (e.g., 50 million disk drives shipped per year).

Another problem is that there might be overlapping errors, whereby a second error occurs while the hardware correction circuitry is currently attempting to fix a prior error. Yet another problem is that the error may be so severe that it is beyond the capabilities of the hardware correction circuitry to handle.

In light of the shortcomings associated with typical hardware correction circuitry, disk drive manufacturers have often added a second layer of error correction. This second error correction layer involves using the hard disk drive's microprocessor to correct errors under firmware control. In other words, this second layer firmware correction attempts to correct those errors which could not be handled by the hardware. If the hardware correction circuitry is capable of correcting the error, it proceeds to fix the error. Otherwise, the firmware handles the error. FIG. 1 is a flowchart describing the steps for performing a typical prior art bi-level hardware/firmware error correction scheme. Initially, a seek is performed to read the data from a sector on one of the disks, step 101. Next, the syndrome is calculated to determine whether there are any errors, step 102. If there are no errors, the next sector is read by repeating step 101 unless step 108 indicates that all of the requested data has been read. However, if there is an error, hardware correction circuitry attempts to fix the error in step 103. If the hardware correction circuitry successfully corrects the error, then step 108 is performed. Otherwise, the firmware error correction scheme handles the error according to steps 105–107. Since the original syndrome has been altered, the disk drive re-reads the sector containing the erroneous data and re-calculates the syndrome, steps 105 and 106. Thereupon, the firmware attempts to correct the error based on the re-calculated syndrome, step 107. If the error is still uncorrectable, the firmware can set a flag or some other indicator to inform the host computer system of the existence of the uncorrectable error. In step 108, a determination whether all of the requested data has been retrieved is made. If so, the read request is finished. Otherwise, the next sector is read and steps 101–108 are repeated.

The main disadvantage associated with the above prior art bi-level error correction scheme stems from the fact that when the hardware correction circuitry first attempts to correct the error, it does so by manipulating the syndrome. As such, the original syndrome is destroyed. This is extremely unfortunate because the firmware correction mechanism also requires the original syndrome before it can start its own error correction process. Consequently, prior art disk drives must halt all on-going operations, re-read the bad sector of the disk, and then re-calculate the syndrome. This process is extremely undesirable because it interrupts the steady flow of data to the host computer system. Interruptions of this nature are especially troublesome when dealing with real-time applications. For instance, even minor disruptions in the data flow for video, audio or graphics applications can cause disconcerting visible glitches or audible snaps and pops. Furthermore, it slows down the overall data transfer rate, thereby detrimentally affecting the overall speed of the computer system. One could possibly store the original syndromes in registers. Again, the additional registers required would increase the overall cost of the disk drive system.

The present invention provides a solution to the above problems by implementing a bi-level, on-the-fly error correction scheme which is fast, efficient, and yet extremely economical. This is accomplished by leveraging existing hardware to reconstruct the original syndrome from a syndrome that had been altered by the hardware correction circuitry. By thusly reconstructing the original syndrome, the present invention avoids having to halt operations, re-read the bad data segment, re-calculate the syndrome and re-read to continue an uncompleted read command.

SUMMARY OF THE INVENTION

The present invention pertains to a method and apparatus for reconstructing syndromes in a disk drive system. Initially, data is stored as a series of bits onto a magnetic medium. A number of ECC bits are calculated based on the stored data bits and appended at the end of each group of data bits. When the data is subsequently read back, a syndrome is generated based on the retrieved data and ECC bits. A syndrome value of "0" indicates that there is no error or that no errors are detected. However, a non-zero syndrome value indicates the presence of one or more errors. In this case, two levels of handling data errors are provided. The first attempt at correcting errors is performed by a dedicated error correction hardware. The error correction manipulates the syndrome in order to fix the error. If the error is deemed uncorrectable by the hardware error correction circuitry, the original syndrome is reconstructed. The syndrome reconstruction is made possible by initially selecting an ECC code which produces syndromes having a repeating, cyclical pattern. Thereby, the original syndrome value is reconstructed by processing the altered syndrome a number of times to place its current value in the next cycle so that it is the same as the original value in the previous cycle. This reconstructed syndrome is then used by the processor to handle the persisting error under firmware control. Thus, the present invention allows for the bi-level error correction to be performed on-the-fly without having to re-read the bad sector and re-calculating the syndrome.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
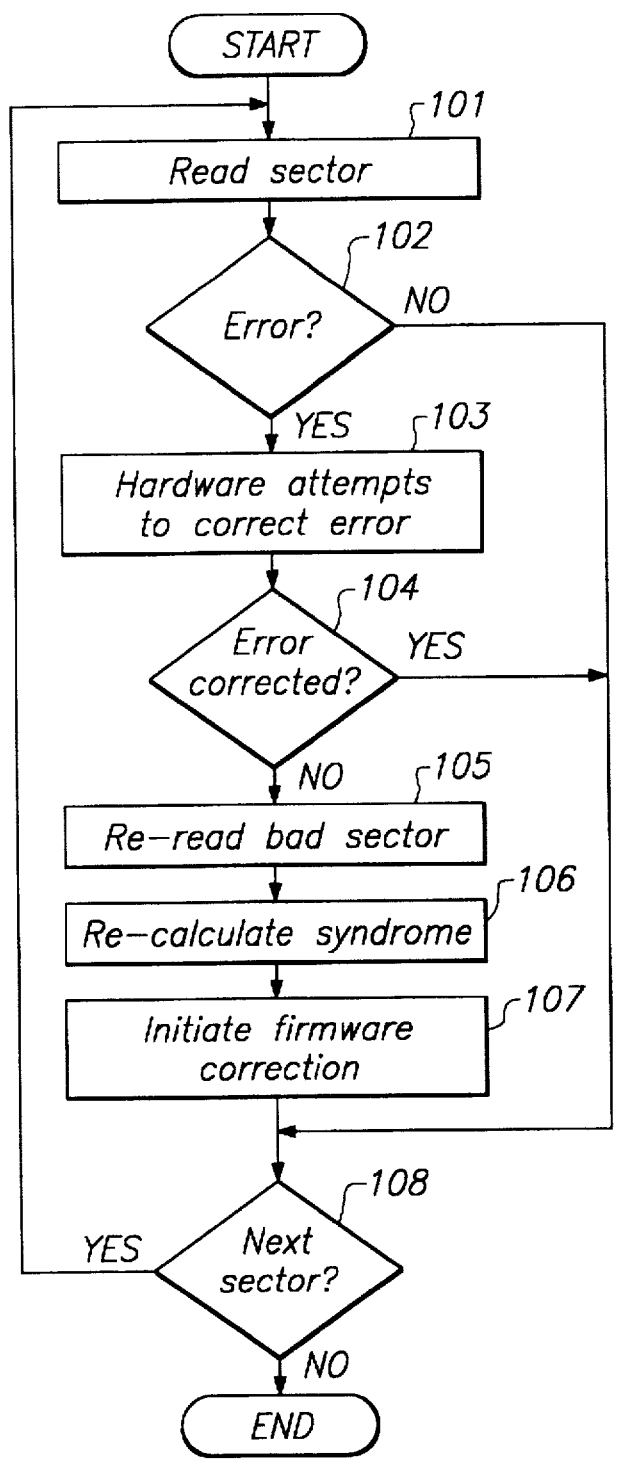
FIG. 1 is a flowchart describing the steps for performing a typical prior art bi-level hardware/firmware error correction scheme.
Figure 2:
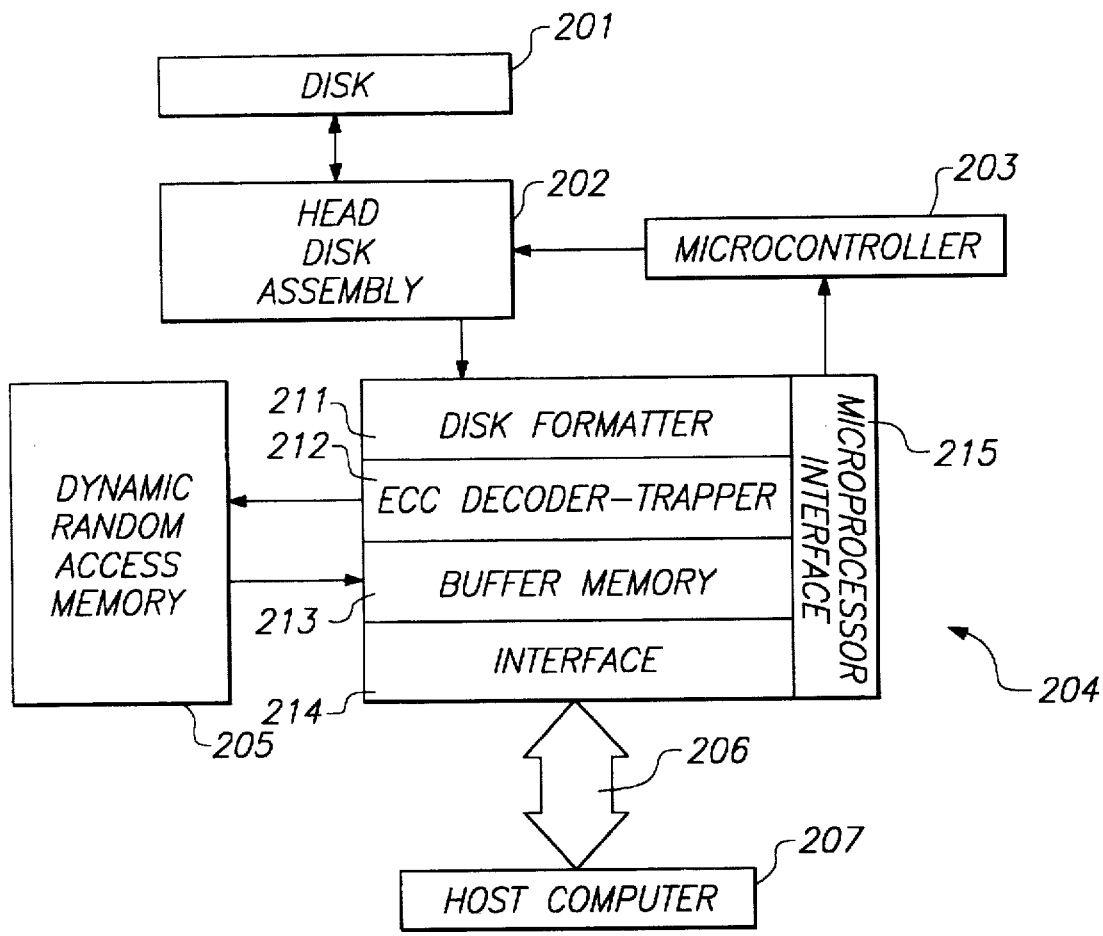
FIG. 2 is a block diagram showing the components of a typical disk drive.

With reference now to FIG. 2, a block diagram showing the components of a disk drive is shown. The components of a disk drive include one or more disks 201 and head disk assembly (HDA) 202 which reads segments of data from disk 201 in response to control signals from microcontroller 203. The data from the disk is then transmitted to an application specific integrated circuit (ASIC) chip 204. ASIC chip 204 includes an interface 214 which interfaces with bus 206 for controlling the transfer of data between the ASIC 204 and the host computer 207. Microprocessor interface 215 provides an interface between microcontroller 203 and blocks disk formatter 211, ECC decoder/trapper 212, buffer memory 213, and bus interface 214 of ASIC 204. Disk Formatter 211 interfaces with the HDA 202 so as to control the writing of disk segments. Error correction code decoder/trapper circuit 212 performs the algorithms for generating ECC bits which are appended to each data segment being written to the disks 201. It also performs the function of trapping syndromes to determine whether any read data contains errors. The decoder/trapper circuit 212 also contains the hardware correction circuitry for correcting minor errors. The correct data is then transferred to the buffer manager residing in buffer memory 213. Eventually, the data is transferred to the dynamic random access memory (DRAM) 205.

Figure 3:
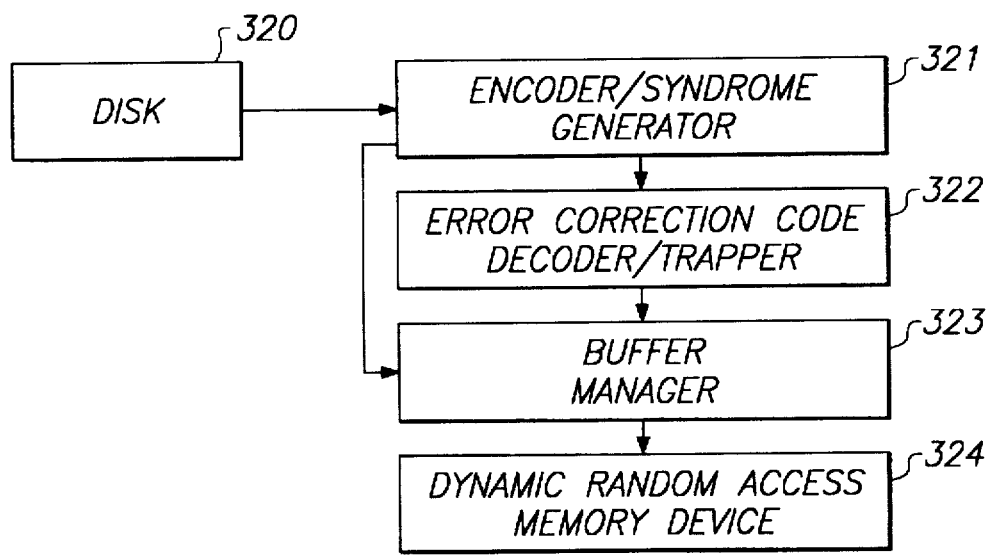
FIG. 3 is a diagram depicting data flow according to principles of the present invention.

FIG. 3 shows a diagram depicting the data flow in the present invention. First, data segments are read by the encoder/syndrome generator 321 from disk 320. The encoder/syndrome generator 321 separates the error correction codes from the data and performs a mathematical function on the error correction codes so as to generate error syndromes. The data is transferred via the buffer manager 323 into dynamic random access memory 324. Encoder/syndrome generator 321 continues to read disk data segments from disk 320. This process of transferring the data via buffer manager 323 into dynamic random access memory 324 continues sequentially and without interruption until all of the data requested by the sequencer is read.

As encoder/syndrome generator 321 separates the error correction code from the data and generates error syndromes, the syndromes are transferred to the ECC decoder/trapper 322. In the ECC decoder/trapper 322, each non-zero error syndrome is multiplied pursuant to a mathematical function in an attempt to correct the error. The mathematical function also determines the location of the error within the segment by trapping the error syndrome corresponding to the error. If the error still persists after being operated on by the hardware correction circuitry for a pre-determined amount of time, this error is deemed uncorrectable by the hardware correction circuit. Upon the detection of an error that is uncorrectable by the hardware of the disk drive, firmware proceeds to attempt to fix the error. The original syndrome is reconstructed by the ECC decoder/trapper 322. If the firmware is successful, the corrected data is then transferred via buffer manager 323, to the appropriate location in DRAM 324. Thus, the corrected data is loaded in DRAM 324.

Figure 4:
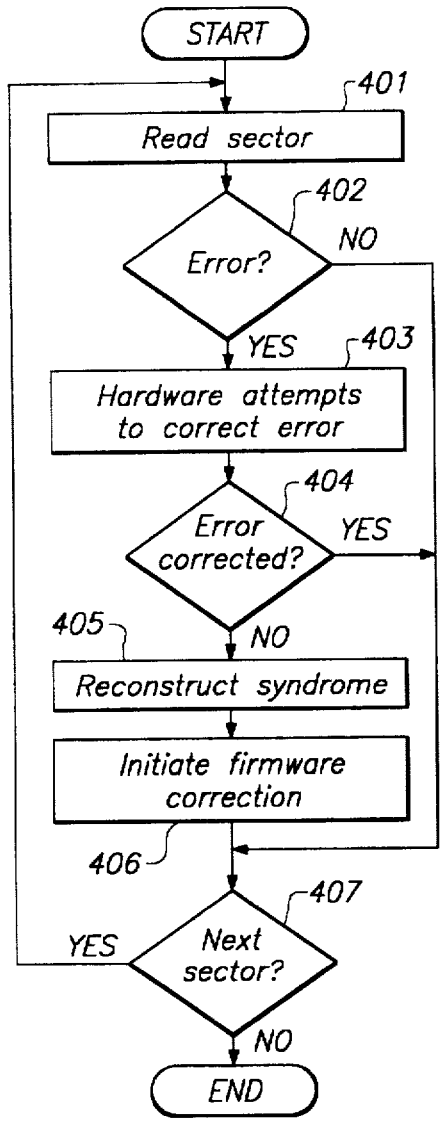
FIG. 4 is a flowchart describing the steps for performing bi-level on-the-fly error correction according to principles of the present invention.

FIG. 4 is a flowchart describing the steps for performing bi-level on-the-fly error correction according to the present invention. Initially, a sector is read according to a read request generated by the host computer system, step 401. The disk drive checks to determine whether there are any errors in the data read from the disk, step 402. If there are no errors, the disk drive proceeds to the next sector until all desired sectors have been read, step 407.

Otherwise, if an error is encountered (e.g., syndrome is non-zero), the hardware correction circuitry attempts to fix the error, step 403. In so doing, it alters the syndrome. However, in the present invention, the syndrome is generated according to a cyclical algorithm. In other words, after a number of iterations, the syndromes start to repeat all over again. The chosen algorithm is designed to produce a specific, repeating pattern of syndromes. This fixed pattern is pre-determined and known aforehand. If the hardware correction circuitry times out without correcting the error, the error is deemed uncorrectable by the hardware, step 404. At this point, the original syndrome is reconstructed. This is made possible by the fact that the syndrome is generated based on a repeating, cyclical pattern. The present invention takes advantage of this fact by tracking the number of iterations that had been performed on the original syndrome by the hardware correction circuitry.

The requisite number of iterations necessary to cycle the altered syndrome back to its equivalent original value is then performed. The firmware uses this equivalent syndrome value to perform its error correction, step 406. In step 407, a determination is made as to whether the read request has been satisfied.

Figure 5:
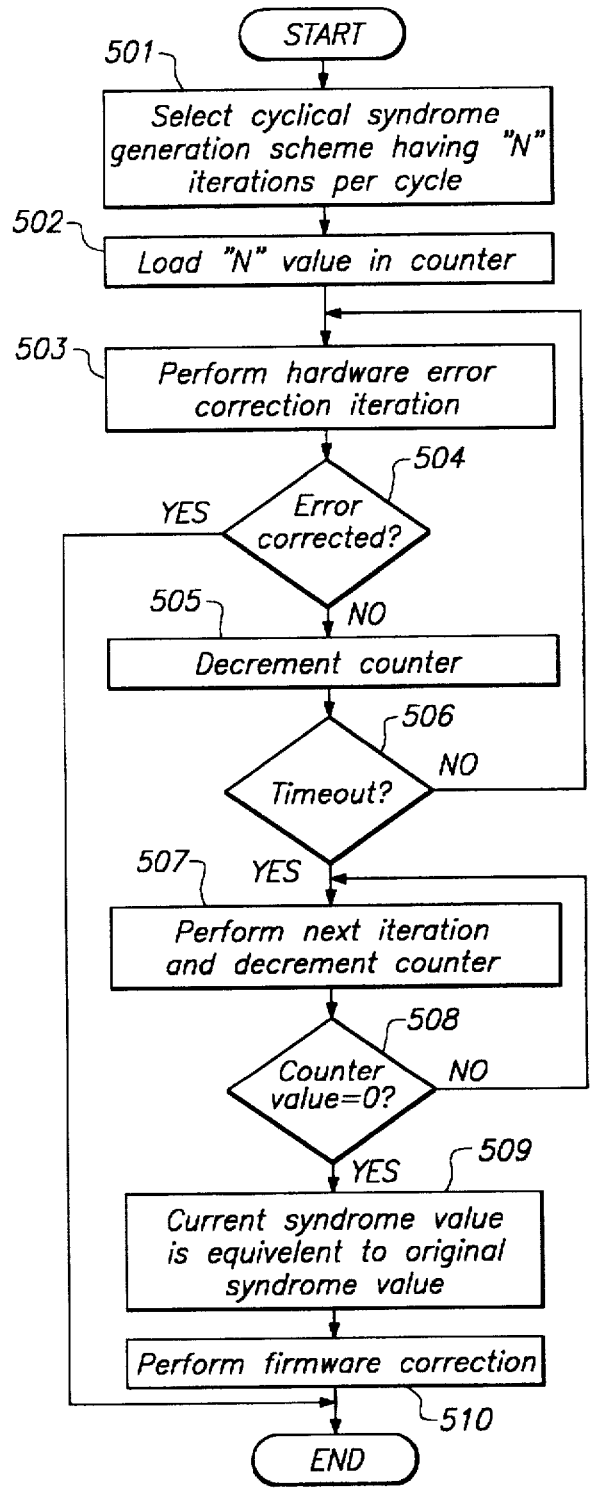
FIG. 5 is a flowchart describing how an equivalent new syndrome is reconstructed from a syndrome that had already been altered by hardware correction circuitry.

FIG. 5 is a flowchart describing how an equivalent new syndrome is reconstructed from a syndrome that had already been altered by the hardware correction circuitry. In step 501, a cyclical syndrome generation scheme having "N" iterations per cycle is selected. In other words, the same syndrome values start repeating after N iterations. This N value is loaded into a counter 502. Hardware correction circuitry performs an iteration in an attempt to correct the error, step 503. This causes the syndrome to become altered. The syndrome now has a value corresponding to the next iteration.

The counter is decremented per iteration. If the error is fixed, the process is complete. However, if the error still persists, a determination is made as to whether the hardware correction circuitry has exceeded its allotted time for correcting the error, step 506. If the hardware correction circuitry has not yet timed out, it performs another iteration, step 503. Again, step 504 determines whether the new iteration has fixed the error. These steps 503–506 are performed until either the error is corrected or until the error is deemed uncorrectable by the hardware correction circuitry as it runs out of time. If the error is deemed uncorrectable, the next iteration is performed, step 507. And the counter is decremented, step 508. A determination is made as to whether the counter has reached a value of 0. If the counter has not yet reached 0, step 507 is repeated until the counter does equal 0. When the counter reaches a value of 0, this indicates that the syndrome has been cycled back to its original state. This new syndrome is equivalent in value to the original syndrome value, step 509. As such, it is used by the firmware in its attempt to fix the error, step 510.

An example of a simple repeating, cyclical syndrome scheme is now described. In this example, the syndrome is generated by applying a modulus of a prime number to the data that is to be protected. For instance, given a prime number of 7 and the correct data of 32, the resultant ECC is equal to 32 mod 7=4. Hence, "100000" is stored in the data field, and "100" is stored in the ECC field. When the data is later read back off the disk, the syndrome is calculated by iteratively subtracting the prime number 7 from the data and then subtracting the ECC value as follows: 32–7=25; 25–7=18; 18–7=11; 11–7=4; and 4–4=0. The decoder/trapper circuit checks the syndrome to determine whether it is 0. In this case, a 0 syndrome indicates that the value "100000" read from the disk is correct. Suppose that there was an error. Instead of reading "100000," the disk drive reads "100001"=33. The corresponding syndrome would then be: 33–7=26; 26–7=19; 19–7=12; 12–7=5; and 5–4=1. A non-zero syndrome indicates the presence of an error. The error would be corrected by iteratively adding the prime number to the syndrome as follows:

1+7=8; 8+7+1=16; 16+7+1=24; 24+7+1=32. Thus, the error correction yields a value of 32="100000" which corresponds to the correct data value.

If, however, the error cannot be corrected by the hardware, the present invention reconstructs the original syndrome. This is made possible by the repeating, cyclical nature of the selected syndrome scheme. For instance, the 32 mod 7 example given above repeats after every seven iterations as shown below:

28 mod 7=0
29 mod 7=1
30 mod 7=2
31 mod 7=3
32 mod 7=4
33 mod 7=5
34 mod 7=6
35 mod 7=0
36 mod 7=1 etc.

Thus, given the same example above, if the hardware correction circuitry were unable to correct the error, the current syndrome has been altered. If the current syndrome is now 5, for example, the original syndrome of 1 is reconstructed by performing three additional iterations.

Figure 6:
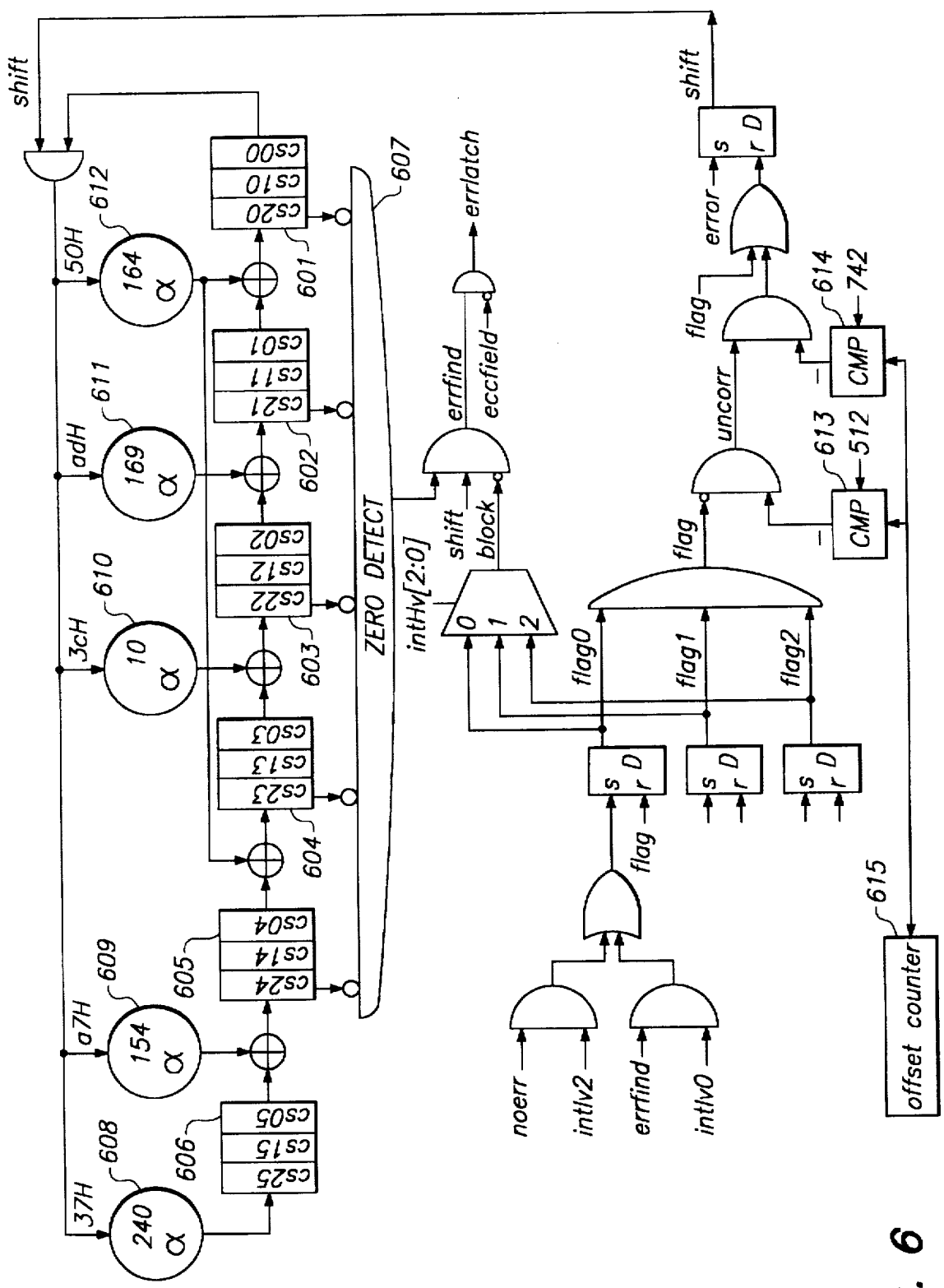
FIG. 6 is a circuit diagram of a preferred embodiment of the hardware correction circuitry in accordance with features of the present invention.

Of course, the example given above is offered to teach the present invention so that it can be more easily understood. The actual implementation of the present invention involves processing multiple syndromes simultaneously by applying a complex polynomial function. Furthermore, in the currently preferred embodiment, a three-way interleave scheme is used to minimize the impact of a group of errors which is concentrated in one specific area. FIG. 6 shows a circuit diagram corresponding to the currently preferred embodiment of the present invention. Eighteen different syndromes are calculated and loaded into the eighteen registers cs00–cs24. Each group of registers 601–606 contains a three-way interleaved set of syndromes. The original syndromes are initially loaded into these registers. A zero detect circuit 607 is used to determine whether there are any errors by detecting syndromes having values of 0. If there are no errors found in one of the interleaves, a flag corresponding to that particular interleave is set. If all three flags (flag0, flag1, and flag 2) are set, this indicates that there are no errors. The next 512 bytes, as indicated by comparator 613, of data are read and their corresponding syndromes are loaded into the registers 601–606. However, if an error is detected, that particular interleave containing the error is blocked to avoid trapping of that error again. Thereupon, the hardware correction circuitry iteratively attempts to fix the problem.

In this embodiment, a finite field multiplication is performed on the syndromes by application of a complex polynomial. The coefficients of this polynomial are represented by the states 608–612. For a galois field of two to the m power, and taking m=8, a finite field of 256 elements may be defined.

In this embodiment, the finite field multiplier functions represent the multiplication of the error correction code with the inverse of a generation polynomial say T(x), a number of times. The number of times that the trapper multiplies depends upon the number of bytes that the coding system has. As the number of multiplication reaches the end of the maximum code length, which in our case is 170 bytes, and still has not yet found the error, it indicates that uncorrectable error has happened and the register does not have the valid error syndrome. In this case, multiplying the reverse of generation polynomial (256-170-6) times will generate the original syndrome (256 is 2 to the power of 8 and 6 is the number of error correction code bytes). If the error still persists after 742 iterations, as indicated by comparator 614, the error is deemed uncorrectable by the hardware correction circuitry. Meanwhile, the offset counter 615 has continuously been updated so that it contains the number of iterations necessary to cycle the registers back so that they contain their equivalent original syndrome values. The registers are shifted accordingly. These register values are then read out by the firmware before it initiates its error correction process.

Figure 7:
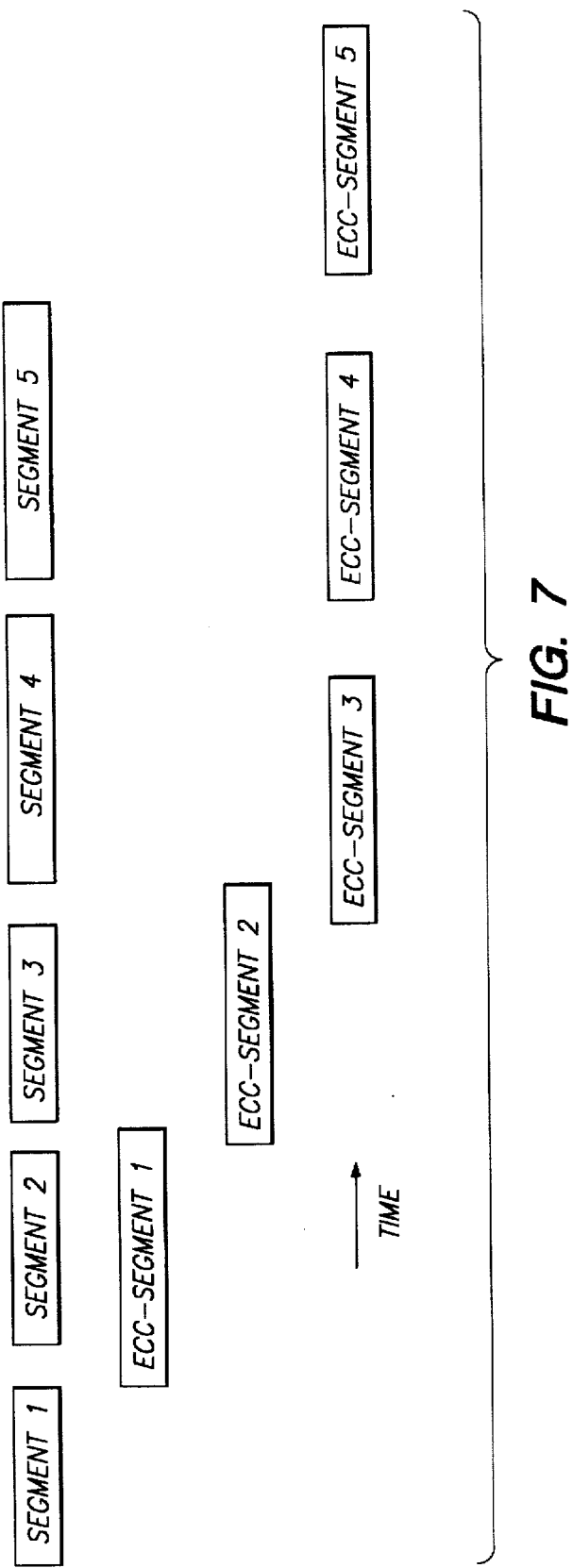
FIG. 7 is a time sequence showing an example of reading data segments from a hard disk in which a first data segment and a second data segment contain errors which are not correctable by the hardware of the disk drive system.

FIG. 7 shows a time sequence showing an example of reading data segments from a hard disk in which data segment 1 and data segment 2 contain errors which are not correctable by the hardware of the disk drive system. Segment 1 is to be read first followed by segment 2, which is sequentially followed by segments 3, 4, and 5 respectively. Segment 1 error detection and correction processing (ECC-segment 1) occurs while the disk drive is reading segment 2. Because segment 1 contains an error which cannot be corrected by the hardware of the disk drive system, the error is handled by recalling the altered syndrome, reconstructing the correct original syndrome, and applying firmware correction. This process is accomplished on-the-fly and therefore, does not interrupt the sequence of reading segments of data. With the present invention, there is no need to halt operations in order to re-read segments of data as is required by typical prior art methods.

Segment 2 is read immediately following the reading of segment 1. Segment 2 error detection and correction processing (ECC-segment2) proceeds while the disk drive reads segment 3. Because segment 2 contains an error which cannot be corrected by the hardware of the disk drive system, the error is handled by reconstructing the original syndrome and performing firmware correction techniques. Again, this sequence is all performed electronically.

Thus, there is no need to reposition the transducer to re-read the bad sector and then regenerate the syndrome based thereon. The data is then either corrected by the firmware or an error message is generated. After segment 3 is read, the error detection and correction processing of segment 3 (ECC-segment3) proceeds at the same time that segment 4 is being read. Similarly, segment 4 error detection and correction processing (ECC-segment 4) occurs while the disk drive reads segment 5. Next, segment 5 error detection and correction processing (ECC-segment 5) is performed. It can be seen by the correction of errors on segment 1 and segment 2 that the flow of error detection and correction processing does not interfere with the predetermined sequence of reading of segments of data. Hence, even errors on multiple following segments do not require a re-read.

The foregoing descriptions of specific embodiments of the present invention have been presented for purposes of illustration and description.

They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of correcting errors in data read from a disk of a disk drive system, comprising:

reading data and error correction code bits that are stored on the disk;

generating an original error syndrome value based on the data and error correction code bits that were read from the disk; and processing the original error syndrome value to determine whether the data contains an error, wherein if an error is detected:

a) attempting to correct the error through a hardware correction circuit, wherein the original error syndrome value becomes altered; and b) determining whether the hardware correction circuit is capable of correcting the error, wherein if the error is deemed uncorrectable by the hardware correction circuit:

i) reconstructing the error syndrome by cycling the altered error syndrome back to a value that is equivalent to the original error syndrome value; and ii) performing error correction under firmware control.

2. The method of claim 1 further comprising the step of generating error correction codes which result in a cyclical, repeating syndrome pattern, wherein the syndrome pattern repeats after N number of iterations.

3. The method of claim 2 further comprising the steps of:

performing X number of iterations by the hardware correction circuit in its attempt to correct the error; and performing N–X additional iterations to cycle back to the syndrome value which is equivalent to the original syndrome value.

4. The method of claim 1 further comprising the steps of:

storing a plurality of error syndromes in a plurality of registers, wherein the plurality of error syndromes correspond to a plurality of bytes of data; and multiplying the plurality of error syndromes by a finite field polynomial.

5. The method of claim 4, wherein the plurality of error syndromes correspond to a three-way interleaved data.

6. The method of claim 1, wherein the hardware and firmware error correction are performed on-the-fly without having to re-read a bad sector.

7. A disk drive system comprising:

a disk for storing data and error correction code bits that are used to correct for any errors which might arise in the data;

a head disk assembly for writing and reading data to and from the disk;

a microcontroller for controlling the writing and reading of data by the head disk assembly;

a syndrome generator for generating an original error syndrome value based on the data and error correction code bits read from the disk;

an error detection circuit coupled to the syndrome generator for detecting whether the data contains an error;

a hardware error correction circuit coupled to the error detection circuit for correcting a detected error, wherein the original error syndrome value becomes altered in attempting to correct the error;

a syndrome reconstruction circuit coupled to the hardware error correction circuit for reconstructing an altered syndrome if the error is deemed uncorrectable by the hardware correction circuit; and a processor coupled to the syndrome reconstruction circuit for performing error correction under firmware control based on a reconstructed error syndrome.

8. The disk drive system of claim 7 further comprising an error correction code generator coupled to the hardware error correction circuit which generates a cyclical, repeating syndrome pattern, wherein the syndrome pattern repeats after N number of iterations.

9. The disk drive system of claim 8, wherein the hardware correction circuit performs X number of iterations in its attempt to correct the error and the syndrome reconstruction circuit performs N-X additional iterations to cycle back to the syndrome value which is equivalent to the original syndrome value.

10. The disk drive system of claim 7 further comprising a plurality of registers for storing a plurality of error syndromes, wherein the plurality of error syndromes correspond to a plurality of bytes of data.

11. The disk drive system of claim 10, wherein the hardware correction circuit multiplies the plurality of error syndromes by a finite field polynomial.

12. The disk drive system of claim 10, wherein the plurality of error syndromes correspond to a three-way interleave.

13. The disk drive system of claim 7, wherein the hardware error correction circuit and the syndrome generator are processed on-the-fly without having to re-read a bad sector.

14. In a magnetic storage device, an apparatus for reconstructing a syndrome that had been altered during an attempt by a hardware error correction circuit to correct a detected error in data so that a reconstructed syndrome value is equivalent to an original syndrome value and can be subsequently used by a processor under firmware control to handle the error if the hardware error correction circuit is unable to correct the error, comprising:

a plurality of registers for storing a plurality of original syndromes;

a multiplication circuit coupled to the plurality of registers for multiplying the plurality of original syndromes with a polynomial, wherein the original syndromes become altered and the altered syndromes are stored back into the registers;

a counter coupled to the multiplication circuit for counting a number of times that the multiplication circuit multiplies the syndromes by the polynomial; and logic coupled to the counter for performing additional multiplications iterations on the syndromes such that the syndromes are cycled to their original values, wherein the number of additional multiplications is performed according to a value stored in the counter.

15. The apparatus of claim 14 further comprising an error correction code generator coupled to the plurality of registers for generating a cyclical, repeating syndrome pattern, wherein the syndrome pattern repeats after N number of iterations.

16. The apparatus of claim 15, wherein a hardware correction circuit coupled to the logic performs X number of iterations in its attempt to correct the error and N-X additional iterations are performed in order to cycle back to the syndrome value which is equivalent to the original syndrome value.

17. The apparatus of claim 14, wherein the plurality of error syndromes correspond to a three-way interleave.

18. The apparatus of claim 14, wherein the hardware error correction circuit and the syndrome generator are processed on-the-fly without having to re-read a bad sector.

* * * * *